United States Patent Office 3,102,823
Patented Sept. 3, 1963

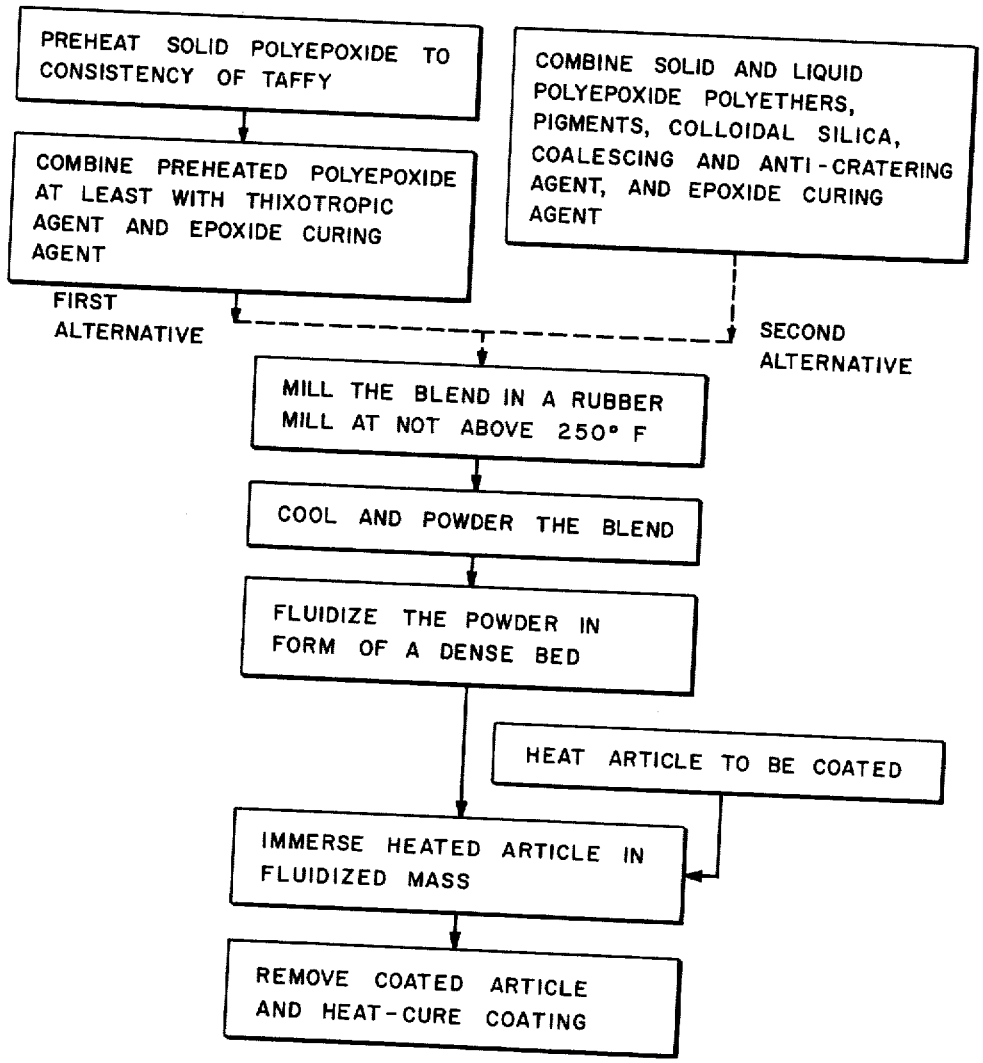

3,102,823
FLUIDIZED BED COATING PROCESS EMPLOYING AN EPOXY RESIN, AND PROCESS FOR PREPARING SAID RESIN
Joseph P. Manasia, Union, and George R. Somerville, Morris Plains, N.J., assignors to Shell Oil Company, a corporation of Delaware
Filed Aug. 11, 1959, Ser. No. 832,896
9 Claims. (Cl. 117—21)

This invention relates to protective coatings on the surfaces of articles and to a method of producing such coatings. More particularly it relates to an improved method for coating surfaces with epoxy resins.

Epoxy resins are well known commercial materials. One of their major uses is in producing surface coatings which are substantially superior to other known coatings in adhesion, toughness, resistance to chemical attack and other desirable characteristics. However, the use of epoxy resins in many product finishing applications requiring their particular outstanding physical and chemical characteristics has been limited by the time-consuming, multiple-coat finishing schedules needed to produce films greater than 1.5 mils in thickness. It has also sometimes been difficult to obtain adequate build of coating on sharp edges and in hard-to-reach areas on irregularly-shaped objects.

Several techniques are known for producing surface coatings of epoxy resins. All of these involve the application to the surface of a liquid containing a resinifiable polyepoxy compound and a curing agent which interacts with the polyepoxy compound to produce the cross-linked, finished resin. The epoxy resins are of the thermoset type, i.e., the cured resins are not reduced to plastic condition by reheating.

It has been proposed to produce surfaces coated with thermoplastic resins by heating the article to be coated and dipping it into a fluidized bed of particles of the thermoplastic resin, causing the particles to adhere to the hot surface and fuse into a coating layer. This method, however, cannot be directly applied to the liquid polyepoxide compositions which have hitherto been employed in the production of epoxy resin surface coatings.

It is an object of this invention to provide an improved method for coating surfaces of articles with epoxy resins. It is another object to provide a new and improved technique for applying epoxy resin coatings to surfaces of articles. It is a further object to provide composites of polyepoxides, curing agents, pigments and other necessary components of surface coatings which can be applied to surfaces of articles by being maintained as a fluidized bed of particles into which the heated article to be coated is immersed.

This invention is illustrated in part by the drawing, the sole FIGURE of which is a schematic representation of the process of the invention showing two alternative methods of producing a composite blend, milling the blend in a rubber mill at not above 250° F., cooling and powdering the blend, fluidizing the powder in the form of a dense bed, immersing a heated article into the fluidized mass, removing the coated article and heat-curing the coating.

THE FLUIDIZED-BED COATING METHOD

In carrying out the coating process of this invention, the coating material is specifically formulated and prepared as will be described hereinafter. The specially prepared coating material is maintained as a continuously fluidized bed of pulverulent granules by means of an evenly distributed current of gas. The article to be coated is at least partially immersed into the fluidized bed of the coating material while the article is hot. In order to produce the desired uniform coating, the article is usually kept in motion during the immersion period; it may be moved in a horizontal or vertical direction or both. In the case where the coating material fluidizes rather poorly, the desired uniform coating is produced more readily by immersing the article into the center of the fluidized mass and holding it still. If possible, the bed itself should then be gently jarred, as by tapping.

Generally the article is preheated to the desired temperature before immersion, but it may also be heated while immersed, e.g., by induction heating. The temperature to which the article is heated is below the decomposition temperature of the article and above the sintering temperature of at least a portion of the components of the fluidized bed. While the article is immersed in the fluidized bed, sintered particles of the coating material adhere to its surface and result in coating of the surface with a layer of at least partly sintered components of the fluidized bed. Ultimately, the adhering particles of the coating material melt and fuse together on the immersed portion of the surface of the article to form a continuous coating thereon, as described more fully below. The thickness of the coating is suitably controlled by the temperature of the immersed article and/or the length of time of immersion thereof in the fluidized bed.

If required, the coating may be reinforced by repeating the above-described process of application, that is, by reheating and redipping the article.

A fluidized bed is defined as a mass of solid particles which exhibits liquid-like characteristics of mobility, hydrostatic pressure and an observable upper free surface or boundary zone across which a marked change in concentration of particles occurs. In a vessel containing a fluidized bed of solid particles there is above the surface boundary a dispersed suspension of such particles in which the concentration of the particles is substantially lower. The fluidized bed is, therefore, frequently referred to as a dense phase and the suspension of particles thereabove as a disperse phase.

The sintering point is defined as that temperature at which the coating material is sufficiently tacky or sticky to adhere to the surface of the article. The melting point is that temperature at which the coating material is sufficiently coalesced to provide a continuous coating of the article.

The apparatus in which the coating process of this invention is carried out may consist of any desired type of open vessel, such as a trough or drum, in which an ascending current of gas which is evenly distributed throughout the cross section of the apparatus, e.g., by means of a porous plate at the bottom of the container, maintains a dense-bed fluidized mass of particles with an upper free surface at least somewhat below the rim of the vessel.

Various types of means may be used for holding the article to be coated. For instance, the article may be held by means of a pair of tongs and manually dipped into the fluidized bed, kept in motion while immersed, and then withdrawn. It is also possible to use racks, conveyors or other similar article-carrying means. Another method which can sometimes be advantageously employed comprises keeping the heated article stationary and immersing it in a fluidized bed by moving the bed up around the article. If desired, the article-holder or portions of the article which it is desired to coat may be covered with a material such as a silicon resin of grease-like consistency to provide a suitable masking material.

Apparatus which is suitable for carrying out the process of this invention is illustrated in FIGS. 1 and 2 of U.S. 2,844,489 to Gemmer.

Any gas which is reasonably inert at the temperatures and with the materials employed may be used as the gaseous medium for fluidizing the coating material. Air is usually satisfactory and is preferred for reasons of economy; however, in order to avoid oxidation it may be sometimes preferable to use nitrogen or some other non-oxidizing gas. The useful pressure of the gas depends on the particular shape and dimensions of the treating tank, as well as on the type of coating material used. The pressure of the gas should not exceed the point where the upper level of the fluidized bed of coating material rises above the sides of the container or where an appreciable dust cloud of the coating material is formed above the container. The minimum gas pressure will be about 7 inches water column; 10 p.s.i. gas pressure is generally sufficient to fluidize a 2–3 foot bed of powder.

The fluidized bed is preferably maintained at a temperature which is sufficient to prevent the accumulation of moisture in the bed. This can be conveniently accomplished by slightly raising the temperature of the gaseous medium. However, caution should be taken to maintain the temperature of the gas, and therefore of the fluidized bed, below the sintering or melting temperature of the coating material.

The period of immersion in the fluidized bed may vary within relatively wide limits. Depending upon the size and heat capacity of the article to be coated, the thickness of the coating desired, the powdered coating material used and the temperature to which the article is preheated before coating, the best immersion time may vary from a fraction of a second up to several minutes. Generally the time of immersion is kept below about 50 seconds and preferably below about 30 seconds. During this period of time, if desired, the article may be repeatedly immersed and withdrawn from the fluidized bed to observe the progress of the formation of the coating and when the coating thickness appears adequate further immersions need not be made.

When the article is removed from the fluidized bed it initially appears covered with a powder. After a short time, however, this powder melts or coalesces into a continuous coating due to transfer of heat from the heated article.

If thin-walled articles are to be coated the heat energy therein is sometimes not sufficient to cause melting of the powder on the surface layer of the coating material, although the underlayer or layer immediately adjacent to the article has been melted. In such case it is sometimes convenient to fill the article with an inert material of high heat capacity, e.g., sand, or higher preheating temperatures can be used or the surface of the coating can be subsequently treated with a small gas torch flame. Alternatively, the subsequent baking temperature is chosen sufficiently high that the surface layer is completely melted thereby.

It is sometimes necessary, in order to obtain good adhesion of the coating to the surface of the article, to clean and roughen the surfaces as, for example, by means of sand or metal grit blasting or acid-etching. This is particularly true of relatively large articles having relatively complex contours. For small articles which do not have any concavities and larger articles which have only convex surfaces to be coated, the sand-blasting step may be omitted since there is generally a certain amount of shrinkage of the coating onto the article so that tight adhesion is automatically effected. If the surfaces of the articles to be coated are likely to be greasy or oily, they should be de-greased by a proper treatment with a suitable solvent, such as carbon tetrachloride.

PARTICLE SIZES OF COATING POWDERS

It has been said that the useful range of particle sizes in the fluidized application of thermoplastic resins is in the range from 0.001 to 0.024 inch diameter.

When relatively thin coatings are to be applied it is generally desirable to avoid the presence of particles whose diameter is larger than the thickness of the desired coating.

When the coating composition consists of powder of a single uniform composition or of no more than two different powdered materials it is preferable to employ particles having diameters in the range between 0.001 and 0.024 inch and preferably a powdered fraction having diameters largely in the range between 0.007 to 0.023 inch. Particle sizes substantially in excess of 0.023 inch should generally be avoided.

It is usually desirable to have as nearly uniform particle size as possible because powder mixtures of relatively uniform size are most easily and most uniformly fluidized and gives rise to the least amount of dust evolution. When mixtures of very small particle size are to be fluidized it is desirable to start air flow to the powdered mixture very slowly and gently in order to avoid excess dust evolution and only gradually to bring the air flow to the desired rate for maintaining the bed in fluidized condition.

On prolonged fluidization of powdered resin mixtures, stratification of particles may take place in various ways. The following are the more common causes:

(1) Large density difference between two or more different solid components of a non-homogeneous powdered mixture.

(2) The hygroscopic nature of a formulation.

(3) An excessive spread in the particle size range of a powdered mixture.

(4) The gradual accumulation of particles which have grown in size, by sintering, beyond the desired maximum.

Stratification due to the first three causes can be avoided by careful formulation and powder preparation. However, continuous use of a fluidized mass with articles whose temperature is above the melting point of the composition usually results in the gradual build-up of excessively large particles. When these coarse particles exceed about 5% of the total mass, the condition manifests itself by poor fluidization and by irreproducibility of film thickness. To assure continuous satisfactory operation, particles in excess of 0.024 inch diameter are continuously or periodically removed from the powdered mixture, e.g., by passing it or parts of it through a U.S. Sieve No. 30 screen. The coarse particles removed in this manner are suitably pulverized and returned to the powder mass.

The following illustrate typical and preferred size distribution ranges:

| Particle diameter | Typical range, percent by weight | Preferred range, percent by weight |
|---|---|---|
| <0.002" | 0–10 | 0–8 |
| >0.002"<0.012" | 65–99 | 90–99 |
| >0.012"<0.024" | 0–35 | 0–5 |
| >0.024" | 0–1 | 0 |
|  | 100 | 100 |

EPOXY COATING COMPOSITIONS FOR FLUIDIZED-BED METHOD

It will be apparent from the above description of the method by which the surface coatings are applied according to this invention that the coating materials must meet the following requirements:

(1) The ingredients must be convertible to fluidizable powder.

(2) The sintering temperature of the powder must be high enough to preclude blocking before application but low enough to provide good cladding and flow properties at application and curing temperatures.

(3) The coating material must provide thick film building and prevent dripping or sagging of thick films at application and curing temperatures.

The ability of epoxy resin formulations to meet the above requirements as well as the performance requirements of the applied coatings is dependent both on the formulation and on the manner of blending the raw materials.

The resin coatings of this invention differ from coatings which have been applied by the fluidized technique according to the prior art in that several different components must be combined in order to provide the desired coating. These components include as a minimum: (1) a polyepoxide which can react with a curing agent to form a cured, cross-linked epoxy resin; (2) a curing agent for the polyepoxide; and (3) a thixotropic agent to give stability to the wet film.

In addition, surface coating formulations according to this invention generally contain pigments and a coalescing and anti-cratering agent; they also may contain wetting agents, other fillers and other suitable components.

POLYEPOXIDES FOR FLUIDIZED COATING COMPOSITIONS

The polyepoxides which can be used in preparing the coating compositions of the present invention comprise those materials possessing more than one vicinal epoxy group, i.e., more than one

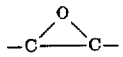

group. These compounds may be saturated or unsaturated, aliphatic, cycloaliphatic, aromatic or heterocyclic, and may be substituted, if desired, with non-interfering substituents such as chlorine, hydroxyl groups, ether radicals and the like. The polyepoxides may be monomeric or polymeric. The epoxy group may be terminal or non-terminal.

For clarity, many of the polyepoxides will be referred to hereinafter in terms of their epoxy equivalency. The term "epoxy equivalency" refers to the number of epoxy groups contained in the average molecule of the desired material. The epoxy equivalency is obtained by dividing the average molecular weight of the polyepoxide by the epoxide equivalent weight. The epoxide equivalent weight is determined by heating one gram sample of the polyepoxide with an excess of pyridinium chloride dissolved in pyridine at the boiling point for 20 minutes. The excess pyridinium chloride is then back-titrated with 0.1 N sodium hydroxide to the phenolphthalein end point. The epoxide value is calculated by considering one HCl as an equivalent of one epoxide. This method is used to obtain all epoxide values reported herein, unless otherwise stated.

If the polyepoxides are single monomeric compounds having all of their epoxide groups intact, their epoxy equivalency will be whole integers, such as 2, 3, 4 and 5. However, in the case of the polymeric-type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like.

The monomeric-type polyepoxide compounds may be exemplified by the following: vinylcyclohexene dioxide, epoxidized soyabean oil, butadiene dioxide, 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4'-bis(2-hydroxy-3,4-epoxybutoxy)diphenyldimethylmethane, 1,3-bis(4,5-epoxypentoxy)-5-chlorobenzene, 1,4-bis(3,4-epoxybutoxy)-2-chlorocyclohexane, diglycidyl ether, 1,3-bis(2-hydroxy-3,4-epoxybutoxy)benzene, 1,4-bis(2-hydroxy-4,5-epoxypentoxy)benzene, 1,2,5,6-di-epoxy-3-hexyne, 1,2,5,6-di-epoxyhexane, and 1,2,3,4-tetra(2-hydroxy-3,4-epoxybutoxy)butane.

Other examples of this type include the glycidyl polyethers of the polyhydric phenols obtained by reacting a polyhydric phenol with a great excess, e.g., 4 to 8 mol excess, of a halogen-containing epoxide in an alkaline medium. Thus, polyether "A" described hereinafter, which is substantially 2,2-bis(2,3-epoxypropoxyphenyl)propane is obtained by reacting bis-phenol (2,2-bis(4-hydroxyphenyl)propane) was an excess of epichlorohydrin as indicated below. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydroxybenzophenone, bis(4-hydroxyphenyl)ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane and the like.

Examples of the polymeric-type polyepoxides include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl)ether, the reaction product or sorbitol and bis(2,3-epoxy-2-methylpropyl)ether, the reaction product of pentaerythritol and 1,2-epoxy-4,5-epoxypentane, the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A further group of the polymeric polyepoxides comprises the hydroxy-substituted polyepoxide polyethers obtained by reacting, preferably in an alkaline medium, a slight excess, e.g., 0.5 to 3 mol excess, of a halogen-containing epoxide as described above, with any of the aforedescribed polyhydric phenols, such as resorcinol, catechol, bis-phenol, bis(2,2'-dihydroxy-dinaphthyl)methane and the like.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethyleneglycol, butylene glycol and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light and the like they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl-2,3-epoxypropyl ether), poly(2,3-epoxypropyl crotonate), allyl-2,3-epoxypropyl ether-styrene copolymer, methallyl-3,4-epoxybutyl ether-allyl benzoate copolymer, poly(vinyl-2,3-epoxypropyl ether), allyl glycidyl ether-vinyl acetate copolymer and poly(4-glycidyloxystyrene).

Examples of non-terminal polyepoxides include epoxidized esters of polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12-15-octadecatrienoate, butyl eleostearate, monoglycerides of tung oil fatty acids, monoglycerides of soybean oil, sunflower, rapeseed, hempseed, sardine, cottonseed and the like.

Another group of non-terminal polyepoxides includes the epoxidized esters of unsaturated monohydric alcohols and polycarboxylic acids, such as, for example, di(2,3-epoxybutyl)adipate, di(2,3-epoxybutyl)oxalate, di(2,3-epoxyheptyl)succinate, di(2,3-epoxybutyl)maleate, di-(2,3-epoxyoctyl)pimelate, di(2,3-epoxypropyl)phthalate, di(2,3-epoxycyclohexyl)adipate, di(2,3-epoxypentyl)thiodipropionate, di(5,6-epoxytetradecyl)diphenyldicarboxylate, di(3,4-epoxyheptyl)sulfonyldibutyrate, tri(2,3-epoxyproyl)1,2,4-butanetricarboxylate, di(5,6-epoxypentadecyl) tartarate, di(4,5-epoxytetradecyl)maleate, di(3,4-epoxybutyl)citrate, and di(4,5-epoxyoctadecyl)malonate. Preferred members of this group comprise the glycidyl esters, such as the glycidyl esters of the dicarboxylic acids preferably containing from 2 to 18 carbon atoms, such as diglycidyl phthalate, diglycidyl maleate, diglycidyl adipate, diglycidyl sebacate, diglycidyl cyclohexanedicarboxylate and the like.

Another group of the polyepoxides includes the epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials includes epoxidized derivatives of polyethylenically unsaturated polycarboxylic acids such as, for example, dimethyl 8,9,12,13- diepoxyeiconsanedioate,
dibutyl 7,8,11,12-diepoxyoctadecanedioate,
dioctyl 10,11-diethyl-8,9,12,13-diepoxy-eiconsanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6 - diepoxycyclohexane-1,2-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Particularly preferred epoxy-containing organic materials to be employed in the process of the invention are the members of the group consisting of the organic compounds possessing a plurality of epoxyalkoxy radicals, e.g., two to four, joined to an organic radical which contains from one to two aromatic rings, organic compounds possessing a plurality of epoxyhydroxyalkoxy radicals, e.g., two to four, joined to an organic radical containing from one to two aromatic rings, the polyepoxy-containing polymeric reaction product of an aromatic polyhydric phenol and epihalohydrin, the polyepoxy-containing polymeric reaction product of an aliphatic polyhydric alcohol and epichlorohydrin, the polyepoxy-containing polymeric reaction product of a polyhydric phenol and a polyepoxide compound, the polyepoxy-containing polymeric reaction product of an aliphatic polyhydric alcohol and a polyepoxide compound, the polymers of the epoxy-containing monomers possessing at least one polymerizable ethylenic linkage prepared in the absence of alkaline or acidic catalysts, and copolymers of the foregoing epoxy-containing monomers and a monomer containing at least one $CH_2=C=$ group prepared in the absence of alkaline or acidic catalysts. The expression "epoxyalkoxy" radical refers to an alkoxy radical substituted with an epoxy group. The expression "epoxyhydroxyalkoxy radical" refers to an alkoxy radical substituted with a hydroxyl and epoxy group.

Coming under special consideration, particularly because of the fine quality of coatings prepared from their resinous products are the monomeric and polymeric-type glycidyl polyethers of dihydric phenols obtained by reacting epichlorohydrin with a dihydric phenol in an alkaline medium. The monomeric products of this type may be represented by the general formula

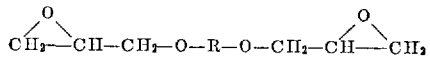

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess, to the epichlorohydrin. The reaction is preferably accompilshed at temperatures within the range of from 50° to 150° C. The heating is continued for several hours to effect the reaction and the product is then washed free of salt and base.

The preparation of some of the glycidyl polyether will be illustrated below. Unless otherwise specified, parts indicated are parts by weight.

PREPARATION OF GLYCIDYL POLYETHERS OF DIHYDRIC PHENOLS

*Polyether "A".*—About 2 mols of bis-phenol was dissolved in 10 mols of epichlorohydrin and 1 to 2% water added to the resulting mixture. The mixture was then brought to 80° C. and 4 mols of solid sodium hydroxide added in small portions over a period of about 1 hour. During the addition, the temperature of the mixture was held at about 90° to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as polyether "A."

*Polyether "B"*.—90 percent by weight of polyether "A" is throughly mixed with 10% by weight of n-butyl glycidyl ether, resulting in a liquid having a substantially lower viscosity than polyether "A." The viscosity at 25° C. is in the range from 5 to 9 poises and the epoxide equivalent, expressed in grams of resin containing one gram equivalent of epoxide, is in the range from 175 to 195.

*Polyether "C"*.—90 percent by weight of polyether "A" is thoroughly mixed with 10% by weight of phenyl glycidyl ether, resulting in a liquid having a somewhat lower viscosity than polyether "A." The viscosity at 25° C. is in the range from 40 to 100 poises and the epoxide equivalent, expressed in grams of resin containing one gram equivalent of epoxide, is in the range from 180 to 195.

*Polyether "D"*.—About 1 mol of bis-phenol and 1.88 mol of sodium hydroxide as a 10% aqueous solution are combined and heated to about 45° C. whereupon 1.57 mol of epichlorohydrin are added rapidly. The temperature increases and remains at about 95° C. for 80 minutes. The mixture separates into a two-phase system and the aqueous layer is drawn off. The resinous layer that remains is washed with hot water and then drained and dried at a temperature of 130° C. The Durrans mercury method melting point of the resulting product is 70° C. and the molecular weight is about 900. The product has an epoxy value of 0.20 eq./100 g. so the epoxy equivalency is 1.8.

*Polyether "E"*.—This glycidyl polyether of still higher melting point is prepared in like manner to that of polyether "B" except that for each mol of bis-phenol there is employed 1.22 mols of epichlorohydrin and 1.37 mols of sodium hydroxide. The resulting product has a melting point of 98° C., a molecular weight of 1400 and an epoxide value of 0.103 eq./100 g.

*Polyether "F"*.—Glycidyl polyethers of higher molecular weight and softening point are best prepared by reacting a lower polyether with less than an equimolecular amount of dihydric phenol. Thus upon heating polyether "E" to a temperature of about 150° C. and then adding 5% by weight of bis-phenol after which the temperature is gradually increased to 190° C. in about 30 minutes followed by maintaining the temperature at this point for an additional 1½ hours, there is obtained a glycidyl polyether having a softening point of 131° C., an epoxy value of 0.05 equivalent of epoxy per 100 grams and a molecular weight of 2900.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 900 and 2900. Particularly preferred are those having a Durrans mercury method softening point of at least about 100° C.

Another suitable group of polyglycidyl ethers for use in this invention are the polyglycidyl ethers of alpha,alpha,-omega,omega-tetrakis(hydroxyaryl)alkanes. This group of compounds is described and illustrated in U.S. 2,806,-016 to Schwarzer. The polyglycidyl ether prepared as in Example 1 of said patent has a melting point of about 85° C. and contains 0.452 epoxy equivalent per 100 grams.

EPOXIDE CURING AGENTS FOR FLUIDIZED COATING COMPOSITIONS

A curing agent is required to convert the epoxy ethers which have been described into hard, dry, stable, cross-linked resins of the coating compositions. In order to be useful in the process of this invention, the curing agent must have the following properties:

(1) It must be solid or semi-solid at room temperature.

(2) It must not interact at room temperature to a substantial degree with the polyepoxy ethers which are present in the composition.

(3) It must react with the polyepoxy ethers at elevated temperatures used in the baking step to produce a cured epoxy resin having the hardness, chemical resistance, flexibility and other characteristics required of high-quality surface coatings.

A great variety of curing agents for curing epoxy resins are known. Many are described in "Epoxy Resins—Their Applications and Technology," by Lee et al., McGraw-Hill Book Co., Inc., 1957, in chapters 3–5. Curing agents which meet the above requirements are referred to herein for convenience as slow-acting epoxy curing agents.

Particularly outstanding results are obtained in the process of this invention when using as curing agent discyandiamide or solid, phenol-blocked polyisocyanate resins.

A useful phenol-blocked polyisocyanate is sold as "Mondur S" by Mobay Chemical Company. A typical compound of this type has the formula

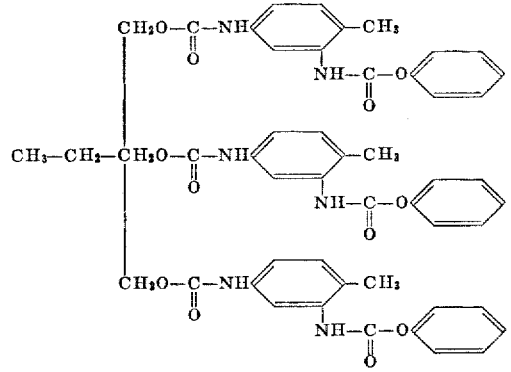

This compound becomes active at temperatures above 284° F. (140° C.) by losing its phenol groups and thus presenting active isocyanate groups. It is a solid at room temperature, softening at about 75°–95° C.

The amount of curing agent employed may vary over a considerable range, such as from 1% to 100% by weight of the polyepoxide, with the exact range depending on the particular type of agent selected. With dicyandiamide as curing agent, the preferred concentration varies from 4 to 9% by weight of the polyepoxide present. With phenol-blocked polyisocyanate resins the amount varies from 50 to 100% by weight. Preferred concentrations for these curing agents depend also on the resin formulation; illustrative examples are given below.

THIXOTROPIC AGENTS FOR FLUIDIZED EPOXY COATING COMPOSITIONS

Stability of the wet films at elevated temperatures is provided by a thixotropic agent. This is a material which gives to such films the characteristics of a thixotropic gel. Thixotropic gels are gels which are fluids of relatively low viscosity when agitated but which set into relatively stable non-fluid masses when not agitated. Their fluidity can be re-established by renewed agitation.

Various thixotropic agents can be employed. They include many highly absorptive materials such as pigments, asbestos floc, silica clays, micas, colloidal silica, organic complexes of bentonite, attapulgite, finely-divided solidified vegetable oil derivatives and the like.

A particularly useful and preferred thixotropic agent for use in this invention is a colloidal silica which is commercially available under the trade name "Cab-o-sil" from Godfrey L. Cabot, Inc. It is prepared by vapor-phase hydrolysis of a silicon compound and is characterized by high chemical purity, low water content, extremely great external surface area and a high degree of particle separation.

Another useful and preferred thixotropic agent is powdered mica, derived from the minerals, muscovite, $H_2KAl_3(SiO_4)_3$ and phlogophite, $H_2Mg_3Al(SiO_4)_3$. A material of this type is available as Mica 200/325 from the Concord Mica Company.

Another useful thixotropic agent is derived from the mineral atapulgite, a hydrated magnesium-aluminum silicate. Materials of this type are available under the trade names "Attasorb" and "Permagel" from the Minerals and Chemicals Corporation of America.. The available materials are ground to a fineness of 90–95% less than 10 microns and are composed of agglomerates of needle-like particles. The powders are light-weight, free-flowing and highly adsorptive.

Another useful thixotropic agent is a material of the class of quaternary ammonium bentonite complexes or salts. These materials are produced by the reaction of bentonite with organic bases or salts of organic bases through base exchange wherein the calcium, sodium, potassium, magnesium or other replaceable bases of the silicate of the bentonite enter into double decomposition with cations of organic bases. Such bentonite complexes, which may be considered bentonite salts of quaternary ammonium compounds, are manufactured by the National Lead Company of New York, New York. They are sold under the trade name "Bentone" with numerals following the name "Bentone" designating the number of carbon atoms in the quaternary compounds from which the bentonite complex is derived. The useful bentonite complexes include "Bentone-26" (dimethyldidodecylammonium bentonite), "Bentone-30" (dimethyldodecylhexadecylammonium bentonite), "Bentone-34" (dimethyldihexadecylammonium bentonite), "Bentone-36" (dimethylhexadecyloctadecylammonium bentonite) and "Bentone-38" (dimethyldioctadecylammonium bentonite).

The thixotropic agent employed in the invention may also be a completely organic material. A suitable organic thixotropic agent, for example, is a finely-divided, solidified vegetable oil derivative, available under the trade name "Thixcin" from the Baker Castor Oil Company of New York. The solid has a specific gravity of 0.990 and is readily dispersed in non-aqueous liquids.

The amount of thixotropic agent required to provide the necessary stability of the uncured coating film is generally in the range from 2 to 30% by weight of the total dry powder composite. Satisfactory coatings have been prepared with amounts of from 2 to 23.3% by weight of thixotropic agent. Different formulations and methods of preparation of the powder may require different concentrations for satisfactory coating. These are readily determined.

METHODS FOR PREPARING FLUIDIZABLE EPOXY RESIN COATING POWDERS

The application of epoxy resin coatings by the fluidized technique according to this invention differs from the fluidized application of thermoplastic resins in that the raw epoxy coating compositions necessarily contain several ingredients which have a tendency to interact both chemically and physically. The preparation of fluidizable epoxy resin composites is, therefore, an essential part of this invention. The technique employed may be designated "rubber mill blending." It is a technique in which all of the components required for the epoxy resin coating are milled together at sufficiently elevated temperature that the polyepoxide is a heavy, viscous liquid, e.g., of the consistency of taffy, the milling being carried out at the lowest temperature at which this consistency can be obtained and being continued for a sufficient length of time to produce a substantially uniform mixture. This milling is suitably carried out on a rubber milling machine and the product is subsequently passed through rolls, sheeted off, dried and pulverized.

Although epoxy resin coating compositions can be produced by means of other techniques, the selection of a particular technique based on the constituents required to be mixed can result in superior coatings, as will be described hereinafter.

ILLUSTRATIVE EXAMPLES

The invention will be better understood from the following examples which are intended for illustrative purposes only and not to be considered a limitation of this invention.

Example 1

Surface coatings were prepared from a mixture of components of the following formulation:

FORMULATION 1

| Component: | Percent weight |
|---|---|
| Polyether "D" | 22.9 |
| Polyether "F" | 22.9 |
| Mondur S [1] | 45.8 |
| Titanium dioxide | 3.8 |
| Phthalocyanine Green | 0.3 |
| Cab-on-sil [2] | 3.3 |
| Butvar B–76 [3] | 1.0 |
| Total | 100.0 |

[1] Phenol-blocked polyisocyanate resin.
[2] Colloidal silica gel of $6-8 \times 10^{-7}$ inch particle diameter.
[3] A polyvinyl-butyral resin available from Shawinigan Products Corporation.

In the above formulation, the mixture of two separate polyepoxide polyethers provides a combined composition which has the desired low melting range so that satisfactory cladding can be achieved at a temperature not much above 400° F. The polyisocyanate resin is present as cross-linking agent for the polyepoxide. Titanium dioxide is added as a hiding pigment and phthalocyanine green as a color pigment. "Cab-o-sil" is provided as a thixotropic agent and "Butvar B–76" as a coalescing and anti-cratering agent.

*Blending method A.*—The mixed polyepoxide ethers were heated in a rubber mill to 250° F., at which point they had the consistency of taffy. The pigments, thixotropic agent and coalescing agent were then added, followed by the powdered curing agent. The total mixture was milled for 10 to 15 minutes at 250° F. and the resulting material, still of taffy consistency, was sheeted off the hot rollers and subsequently pulverized to a non-blocking power having particle size range from 0.002 to 0.024 inch.

The powder was fluidized in the above-described apparatus and articles were coated therewith in the manner described above. Method A can be modified by adding the pigments in dispersion in an equal weight of a liquid polyepoxide such as polyether "A." Compositions prepared by this modified blending technique are equally as good in all respects as those prepared by unmodified method A an dfurthermore have improved gloss.

Example 2

Surface coatings were prepared from composites having the following formulations:

| Component | Formulation 2, percent weight | Formulation 3, percent weight |
|---|---|---|
| Polyether "F" | 83.4 | 87.5 |
| Polyether "B" | 4.6 | 0.0 |
| Titanium dioxide | 2.0 | 2.1 |
| Phthalocyanine Green | 0.5 | 0.5 |
| Butvar B–76 [a] | 1.0 | 1.0 |
| Cab-o-sil [b] | 4.5 | 4.7 |
| Dicyandiamide | 4.0 | 4.2 |
| Total | 100.0 | 100.0 |

[a] A polyvinyl-butyral resin available from Shawinigan Products Corporation.
[b] Colloidal silica gel of $6-8 \times 10^{-4}$ inch particle size.

By carrying out a series of experiments in which the amount of thixotropic agent added was varied it was found that about 4.5% "Cabo-sil" was required to satisfactorily stabilize the resin films of these compositions.

It was also found that to obtain a pourable liquid consistency of these compositions for preparing the coating powder by the fusion technique, temperatures in the range from 400 to 425° F. were required. On the other hand, the dicyandiamide and polyepoxy resins cure rapidly at temperatures above 325° F., so that it is not possible to prepare a composite mixture containing both materials by fusion blending of the mixture.

*Example 3*

Surface coatings were prepared by the fluidized powder techniques herein described from composites having the following formulation:

FORMULATION 4

| Component: | Percent weight |
|---|---|
| Polyether "F" | 32.2 |
| Polyether "D" | 32.2 |
| Polyether "B" | 3.6 |
| Titanium dioxide | 1.6 |
| Phthalocyanine Green | 0.4 |
| Butvar B-76 [1] | 0.8 |
| Mica [2] | 23.2 |
| Dicyandiamide | 6.0 |
| Total | 100.0 |

[1] A polyvinyl-butyral resin available from Shawinigan Products Corporation.
[2] Ground to 200-325 mesh.

The present invention is suitable for the coating of a variety of materials. It has been successfully employed, for example, in coating of pipe hangers, outdoor motor gear housing 6" x 12" cold rolled steel panel and expanded metal sheeting.

The present formulations and methods of preparation are equally applicable in a modification in which the inside surface of a hollow article, such as a pipe or drum, is coated by placing it such that its hollow space is vertical and open at the bottom, heating it by applying heat to the outside surface, and moving up and down inside the hollow opening a device that sprays a mass of powder against the inner surfaces; the surplus powder is collected beneath the article and is recirculated to the spraying device.

We claim as our invention.

1. In the process for coating an article with an epoxy resin which comprises
   (1) preparing a dry, fluidizable powdered epoxy resin composition,
   (2) fluidizing said composition by passing a distributed ascending current of inert gas therethrough to form a dense-phase fluidized bed,
   (3) heating the article to be coated to a temperature which lies between the sintering point and the decomposition point of the coating composition and below the deterioration point of the article,
   (4) immersing the heated article in said dense phase,
   (5) removng the article containing a layer of coating material adhering to its surface and
   (6) maintaining said coated article at an elevated temperature for a sufficient time to cure said coating,
the improvement which comprises employing as said powdered composition a fluidizable pulverulent mass of particles of homogenous composition prepared by
   (1) preheating a solid polyepoxide to the consistency of taffy,
   (2) adding thereto at least a thixotropic agent and an epoxide curing agent selected from the group consisting of dicyandiamide and phenol blocked polyisocyanate resin which does not substantially interact with said epoxide at temperatures below about 250° F.,
   (3) milling the resulting mixture in a rubber mill at an elevated temperature not in excess of about 250° F. for a sufficient time to produce a uniform blend, and
   (4) cooling and pulverizing said blend.

2. The process according to claim 1 in which said curing agent is dicyandiamide.

3. The process according to claim 1 in which said curing agent is a phenol blocked polyisocyanate.

4. In the process for coating an article with an epoxy resin which comprises
   (1) preparing a dry, fluidizable powdered epoxy resin composition,
   (2) fluidizing said composition by passing a distributed ascending current of inert gas therethrough to form a dense-phase fluidized bed,
   (3) heating the article to be coated to a temperature which lies between the sintering point and the decomposition point of the coating composition and below the deterioration point of the article,
   (4) immersing the heated article in said dense phase,
   (5) removing the article containing a layer of coating material adhering to its surface and
   (6) maintaining said coated article at an elevated temperature for a sufficient time to cure said coating,
the improvement which comprises preparing said powdered coating composition as a dry fluidizable mass of particles by
   (1) blending a rubber mill, at an elevated temperature not in excess of about 20° F., a composite of
      (a) polyepoxide polyethers having Durrans mercury method melting points in the range from about 70° to about 130° C. and a sintering temperature between about 350° and about 400° F,
      (b) liquid polyepoxide polyethers,
      (c) pigments in the amount of from 5 to 10% by weight of said polyethers,
      (d) colloidal silica in the amount of from 1 to 3% by weight of said polyethers, sufficient to stabilize the fluid coating film,
      (e) a coalescing and anti-cratering agent in the amount from 2 to 4% by weight of said polyethers and
      (f) an epoxide curing agent selected from the group consisting of dicyandiamide and phenol blocked polyisocyanate resin which does not substantially interact with said epoxide at temperatures below about 250° F.,
   (2) milling said mixture for 10 to 15 minutes at about 250° F. and
   (3) cooling and pulverizing the resulting blend.

5. The process according to claim 4 in which said curing agent is dicyandiamide, and the amount of said liquid polyepoxide is the same, by weight, as the amount of said pigment.

6. A method for preparing a dry, fluidizable pulverulent mass of particles of homogenous composition suitable for use in a fluidized coating process which comprises
   (1) preheating a solid polyepoxide to the consistency of taffy,
   (2) adding thereto at least a thixotropic agent and an epoxide curing agent selected from the group consisting of dicyandiamide and phenol blocked polyisocyanate resin which does not substantially interact with said epoxide at temperatures below about 250° F.,
   (3) milling the resulting mixture in a rubber mill at an elevated temperature not in excess of about 250° F. for a sufficient time to produce a uniform blend, and
   (4) cooling and pulverizing said blend.

7. The method according to claim 6, in which said curing agent is dicyandiamide.

8. A method for preparing a dry, fluidizable, pulverulent mass suitable for use in a fluidized coating process which comprises
   (1) blending in a rubber mill, at an elevated temperature not in excess of about 250° F., a composite of
      (a) polyepoxide polyethers having Durrans mercury method melting points in the range from about 70° to about 130° C. and a sintering temperature between about 350° and 400° F.,
(b) liquid polyepoxide polyethers,
(c) pigments in the amount of from 5 to 10% by weight of said polyethers,
(d) colloidal silica in the amount of from 1 to 3% by weight of said polyethers, sufficient to stabilize the fluid coating film,
(e) a coalescing and anti-cratering agent in the amount from 2 to 4% by weight of said polyethers and
(f) an epoxide curing agent selected from the group consisting of dicyandiamide and phenol blocked polyisocyanate resin which does not substantially interact with said epoxide at temperatures below about 250° F., (2) milling said mixture for 10 to 15 minutes at about 250° F. and (3) cooling and pulverizing the resulting blend.

9. The method according to claim 8 in which said curing agent is dicyandiamide, and the amount of said liquid polyepoxide is the same, by weight, as the amount of said pigment.

References Cited in the file of this patent
UNITED STATES PATENTS

| | | |
|---|---|---|
| 2,786,794 | Gams et al. | Mar. 26, 1957 |
| 2,844,489 | Gemmer | July 22, 1958 |
| 2,955,958 | Brown | Oct. 11, 1960 |
| 2,969,038 | Neumann | Jan. 24, 1961 |
| 3,039,987 | Elbling | June 19, 1962 |

FOREIGN PATENTS

| | | |
|---|---|---|
| 1,042,442 | Germany | Oct. 30, 1958 |
| 807,238 | Great Britain | Jan. 14, 1959 |
| 220,363 | Australia | Feb. 18, 1959 |

OTHER REFERENCES

Schack, "A Manual of Plastics and Resins" (1950), Chemical Pub. Co., (New York); pp. 115–116 relied on.

Products Finishing, 23 (No. 1), October 1958; page 64 relied on.

Lee et al., Epoxy Resins (1957), McGraw-Hill (New York); pp. 110, 146–149 relied on.

UNITED STATES PATENT OFFICE
CERTIFICATE OF CORRECTION

Patent No. 3,102,823 September 3, 1963

Joseph P. Manasia et al.

It is hereby certified that error appears in the above numbered patent requiring correction and that the said Letters Patent should read as corrected below.

Column 14, line 23, for "20° F." read -- 250° F. --.

Signed and sealed this 29th day of June 1965.

(SEAL)
Attest:

ERNEST W. SWIDER
Attesting Officer

EDWARD J. BRENNER
Commissioner of Patents